United States Patent
Chakrabarti et al.

(10) Patent No.: US 12,459,058 B2
(45) Date of Patent: Nov. 4, 2025

(54) LASER PROCESSING HEAD HAVING CONTAMINATION RESISTANCE

(71) Applicant: II-VI Delaware, Inc, Wilmington, DE (US)

(72) Inventors: Romon Chakrabarti, Berlin (DE); Danny Chan, Berlin (DE); Patrick Kühl, Berlin (DE); Hannes Noack, Ludwigsfelde (DE); Georg Schmidt, Stahnsdorf (DE); Alexander Müller, Ahrensfelde (DE)

(73) Assignee: II-VI DELAWARE, INC., Wilmington, DE (US)

( * ) Notice: Subject to any disclaimer, the term of this patent is extended or adjusted under 35 U.S.C. 154(b) by 1049 days.

(21) Appl. No.: 17/448,826

(22) Filed: Sep. 24, 2021

(65) Prior Publication Data

US 2023/0095918 A1 Mar. 30, 2023

(51) Int. Cl.
*B23K 26/38* (2014.01)
*B23K 26/06* (2014.01)
(Continued)

(52) U.S. Cl.
CPC .......... *B23K 26/38* (2013.01); *B23K 26/0643* (2013.01); *B23K 26/0648* (2013.01); *B23K 26/128* (2013.01); *B23K 26/142* (2015.10)

(58) Field of Classification Search
None
See application file for complete search history.

(56) References Cited

U.S. PATENT DOCUMENTS

| | | | |
|---|---|---|---|
| 3,953,706 A | * | 4/1976 | Harris .................... H02G 1/128 219/121.68 |
| 5,239,552 A | | 8/1993 | Okuyama |

(Continued)

FOREIGN PATENT DOCUMENTS

| | | |
|---|---|---|
| DE | 43 29 322 A1 | 3/1994 |
| DE | 100 47 057 A1 | 4/2002 |

(Continued)

OTHER PUBLICATIONS

JP 2021070055 A (Takechi, Takahiro) May 6, 2021 [retrieved on Oct. 24, 2024]. Retrieved from Espacenet Database, translation by EPO and Google (Year: 2021).*

(Continued)

*Primary Examiner* — John J Norton
*Assistant Examiner* — Theodore J Evangelista
(74) *Attorney, Agent, or Firm* — Blank Rome LLP (57) ABSTRACT

A laser processing head for directing a laser beam includes two reflectors and a sole lens element. The first reflector disposed in a housing's interior reflects the laser beam from a source to the second reflector, which then reflects the laser beam toward a process zone for a workpiece. The single lens element is disposed in the housing's interior between the reflectors. The lens element can be moved to adjust a focal position of the laser beam beyond the housing's outlet. To reduce contamination, one or more nozzles are configured to direct purge gas across one or more of the first reflector, the second reflector, and the lens element, while one or more collection areas disposed in the interior are configured to collect contamination directed from the purge gas.

24 Claims, 3 Drawing Sheets

(51) Int. Cl.
*B23K 26/12* (2014.01)
*B23K 26/142* (2014.01)

(56) References Cited

U.S. PATENT DOCUMENTS

| | | | |
|---|---|---|---|
| 9,031,110 | B2 | 5/2015 | Murray |
| 10,456,864 | B2 | 10/2019 | Izumi |
| 11,154,948 | B2 | 10/2021 | Wittwer |
| 2014/0204376 | A1* | 7/2014 | Day ...................... G01J 3/0208 356/318 |
| 2016/0248215 | A1 | 8/2016 | Suzuki |
| 2016/0368091 | A1 | 12/2016 | Kung |
| 2017/0050267 | A1 | 2/2017 | Kung |
| 2017/0080524 | A1* | 3/2017 | Izumi .................. B23K 26/128 |
| 2017/0082587 | A1 | 3/2017 | Izumi |
| 2017/0326669 | A1 | 11/2017 | Moser |
| 2019/0176263 | A1 | 6/2019 | Ziemann |
| 2021/0362270 | A1* | 11/2021 | Dajnowski ......... B23K 26/1224 |

FOREIGN PATENT DOCUMENTS

| | | |
|---|---|---|
| DE | 100 60 176 A1 | 6/2002 |
| DE | 101 23 097 A1 | 12/2002 |
| DE | 102 26 359 A1 | 12/2003 |
| DE | 10 2005 025 119 A | 12/2005 |
| DE | 2014 210838 A1 | 12/2015 |
| DE | 102016117039 A1 | 3/2017 |
| DE | 102016117040 A1 | 3/2017 |
| JP | 2001 259872 A | 9/2001 |
| JP | 2004 306106 A | 11/2004 |
| JP | 2005081399 A | 3/2005 |
| JP | 2009 226474 A | 10/2009 |
| JP | 2021070055 A * | 5/2021 |
| WO | 95/03911 | 2/1995 |

OTHER PUBLICATIONS

Office Action in counterpart German Appl. 102021006265.5 mailed Jul. 18, 2022, 13-pgs.

* cited by examiner

LASER PROCESSING HEAD HAVING CONTAMINATION RESISTANCE

BACKGROUND OF THE DISCLOSURE

A laser processing head, such as used for cutting or material processing, can provide a high-power laser beam of 10 kW and even up to 30 kW. Due to the working conditions, the high-power head can be subject to contamination, which can damage the lenses and other optics in the head and can undermine the head's performance. For example, assembly and repairs of the laser processing head can introduce contamination into the head. Additionally, during welding and cutting of workpieces, emissions can occur that deposit contaminants on the optical surfaces. Contaminants not only limit the performance of the optical systems but can also damage or even destroy the laser optics.

Internal and external contamination is likely the single most severe source of possible failure for the optics. All assembly processes bear the risk of creating contamination so there needs to be a solution to decrease its impact and damage. The known state of the art aims to reduce the number of components required for assembly of a processing head, to reduce the number of screw fittings that can produce contamination, and to assemble optics for the processing head in clean rooms. Yet, creation of contaminants cannot be completely avoided.

The subject matter of the present disclosure is directed to overcoming, or at least reducing the effects of, one or more of the problems set forth above.

SUMMARY OF THE DISCLOSURE

A laser processing head disclosed herein is for directing a laser beam. The head comprises a housing, at least one reflector, a lens element, one or more nozzles, and one or more collection areas. The housing has an interior for passage of the laser beam along an optical axis from an inlet to an outlet. The at least one reflector is disposed in the interior of the housing and reflects the laser beam along the optical axis between the inlet and the outlet. The lens element is disposed in the interior of the housing. The lens element is movable along the optical axis and is configured to adjust a focal length of the laser beam. The one or more nozzles are configured to direct purge gas across one or more of the at least one reflector and the lens element. The one or more collection areas are disposed in the interior and are configured to collect contamination directed from the purge gas.

In a laser processing head of the present disclosure, the at least one reflector can include first and second reflectors disposed in the interior of the housing and reflecting the laser beam along the optical axis from the inlet. Each of the reflectors can have a nozzle and an associated collection area. Likewise, the lens element can include a nozzle and an associated collection area.

A laser cutting machine disclosed herein is used with a laser source to cut a workpiece. The machine comprises a laser processing head and an actuator. The laser processing head receives laser radiation from the laser source. The head can include any of the configurations noted above. The actuator supports the laser processing head and is configured to manipulate the laser processing head relative to the workpiece.

The foregoing summary is not intended to summarize each potential embodiment or every aspect of the present disclosure.

DETAILED DESCRIPTION OF THE DISCLOSURE

Figure 1:
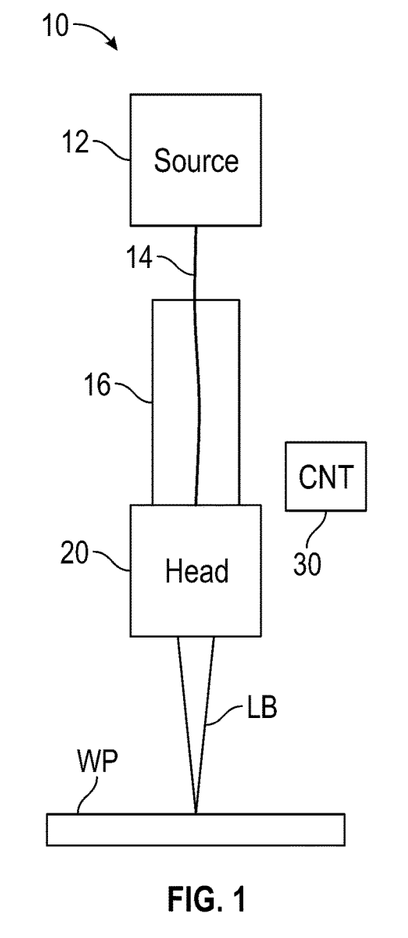
FIG. 1 illustrates a laser delivery system according to the present disclosure.

FIG. 1 illustrates a laser delivery system 10 according to the present disclosure, A laser source 12 generates high-power laser light that is propagated along a fiber optic cable 14 to a laser processing head 20. The laser source 12 can be any suitable multi-mode or a single-mode laser depending on the laser power required.

The laser processing head 20 can be moved relative to a workpiece WP and/or can have the workpiece WP moved relative to it. For example, the laser processing head 20 can be moved by a gantry system, robotic arm, or other apparatus 16 used in the art. Internally, the laser processing head 20 includes optics to focus the laser energy in a laser beam LB to the workpiece WP, and the laser processing head 20 can be used for cutting, brazing, welding, additive manufacturing, or some other lasing process. A control unit 30 can be used to control operation of components of the system 10, such as in a manner discussed below.

In one particular implementation, the laser delivery system 10 can be used for a flatbed laser cutting machine. In general, the workpiece WP is supported on a flatbed of the machine, and the laser processing head 20 is manipulated by a gantry system 16 above the workpiece WP to make two-dimensional cuts, trims, or holes in the workpiece WP. Typically, the head 20 is manipulated primarily in a horizontal plane over the workpiece and may be lifted and lowered for distancing relative to the workpiece. Of course, the system 10 can be used in other implementations, e.g. bevel cutting or mounted on an industrial robot.

Figure 2:
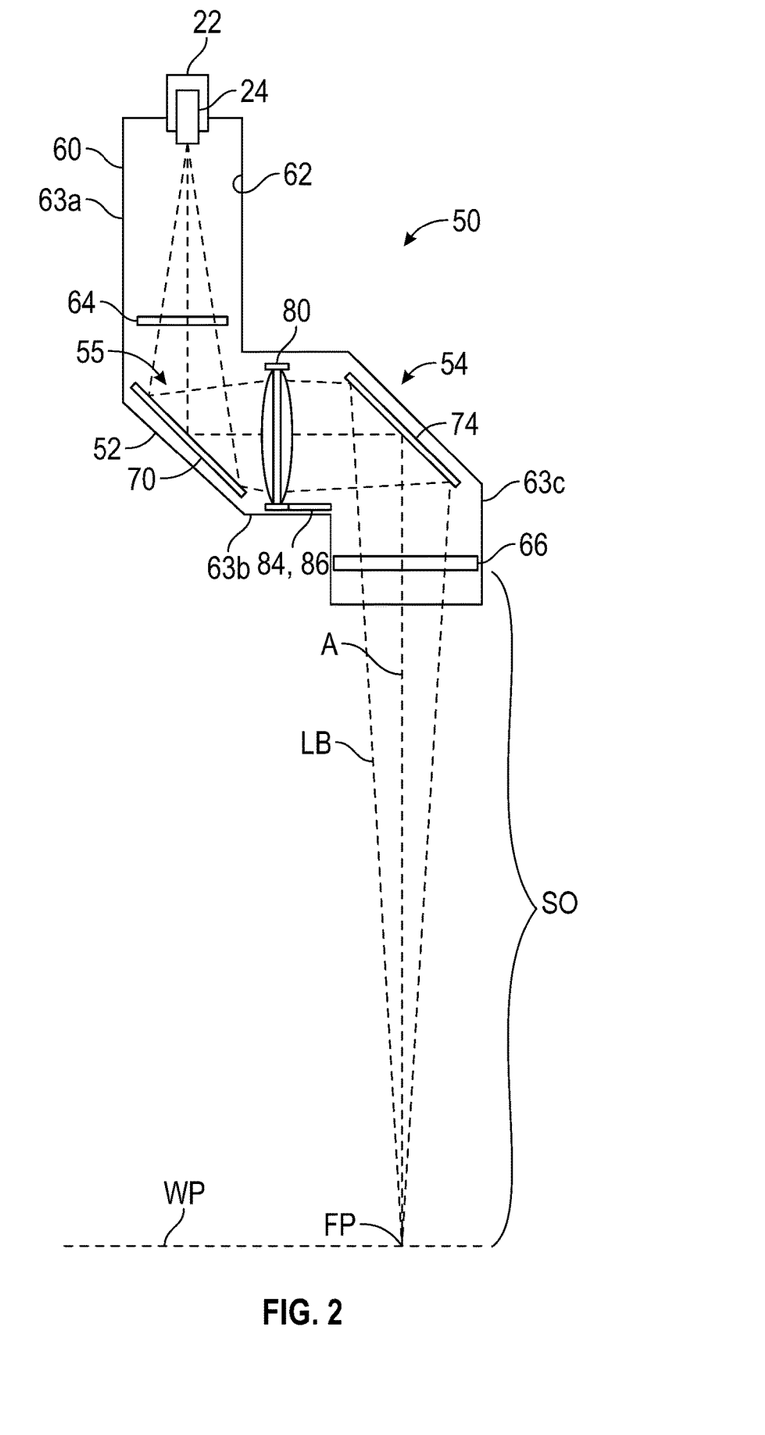
FIG. 2 schematically illustrates a laser processing head according to the present disclosure.

FIG. 2 schematically illustrates a laser processing head 50 according to the present disclosure. The laser processing head 50 includes a housing 60 for internal optics 55. A delivery fiber 24, such as from a fiber optic cable connected to a cable receiver 22, conducts the laser light into the interior 62 of the head 60. Cover slides 64, 66 disposed in the housing 60 can protect the internal optics 55 from contamination, making a clean space in the interior 62 in which a first reflector 70, a lens element 80, and a second reflector 74 are arranged.

During operation, the laser input (e.g., high-power laser delivery fiber 24 from cable receiver 22) in the head 60 emits a high-power laser beam LB in the interior 62. The laser beam LB passes through the upper cover slide 64 and is reflected by the first reflector 70. The reflected laser beam then passes through the lens element 80, which converges the laser light. The second reflector 74 then reflects the converging light of the laser beam to the focus point FB for impinging on a workpiece WP so the focused laser beam LB emitted from the housing 60 can achieve the purposes of the laser process, such as welding, additive manufacture, cutting, etc. Both the first reflector 70 and the second reflector 74 can be partially transmissive so process observations can be made. Both reflectors 70, 74 may also be used to monitor the laser or the head's internal condition. Additionally or alternatively, the reflectors 70 and/or 74 can be tilted to change the lateral placement of the focal point FP on the workpiece WP.

In general, the housing 60 can include an arrangement of modules 63a-c that assemble together to make up the housing 60. Several modules can be interchangeable and can be affixed together with various fixtures, such as mounting bolts, precision thread holes, flanges, etc. Each of the modules 63a-c defines an internal passage to transmit the laser beam LB input from the delivery fiber 24 along an optical axis of the head 50 to the process zone.

Preferably, the head 50 has a reduced complexity and has few optical surfaces. A conventional laser processing head such as used for cutting head typically has many optical elements that are expensive and require maintenance, and the conventional head can be very sensitive to contamination due to the many optical surfaces used. As can be seen, the optics 55 of the disclosed laser processing head 50 uses few optical components 70, 74, 80.

Additionally, the head 50 includes only a few modules 63a-c to connect together to form the housing 60. These modules may include an input module 63a for the cable receiver 22 and the delivery fiber 24; an optics module 63b having the lens element 80, an actuator or drive 86, reflectors or mirrors 70, 74, etc.; and an output module 63b. Alternatively, the reflectors 70 and 74 may also be integral to the input module 63a and the output module 63c, respectively. Extension points 52, 54 behind the reflectors 70 and 74 can be used for process observation and cooling. Other possible modules for the head 20 can include any number of interface or adapter modules (not shown), a process monitoring module (not shown) to which viewing sensors can attach, a cover slide module (not shown) having the replaceable cover slides 64, 66, and the like, although features for any of these can be combined with the other modules 63a-c.

The laser processing head 50 provides a minimum Z-adjustment of the focus point FP for very high laser powers (>20 kW). The working distance of the head 50 is preferably large so a large standoff SO can be maintained between the process cover slide 66 and the laser process at the workpiece WP to minimize contamination. In one example implementation, the laser processing head 50 can have a focal length of about 300-mm, a numerical aperture of about 150-mrad, and a magnification M greater than 1.5. The adjustment in the Z-axis (Delta Z) for the focal point FP can be greater than 40-mm, and may even be greater than 60-mm.

Overall, the laser processing head 50 is resistant to contamination. As discussed in more detail below, the head 50 further includes a cross-jet assembly (not shown) to provide cross-jets of gas for handling contamination inside the housing's interior 62. Additionally, the head 50 includes one primary lens element 80, apart from the replaceable optics of the cover slides 64, 66. In general, the lens element 80 may include only one lens, but the element 80 may include a group of two or more lenses as the case may be. In any event, a single, sole, or solitary lens element 80 is provided in the head 50 as opposed to multiple elements for collimating, focusing, and the like.

The optical axis A of the lens element 80 is oriented horizontally in an orientation suited for a 2-D flatbed cutting machine. The head 50 can also be tilted so bevel cutting is possible. As shown here, the cable receiver 22 may extend vertically on the housing 60 to connect vertically to a laser cable (14). To route the laser beam LB from the delivery fiber 24, through the lens element 80, and to the workpiece WP, the head 50 has two reflectors 70, 74. One reflector 70 or 74 can be used for lateral adjustment of the focus position, and both reflectors 70, 74 may be used for process monitor ports at the extension points 52, 54. In an alternative configuration, the cable receiver 22 extend horizontally on the housing 60 to connect horizontally to a laser cable (14) so that only one reflector 74 is needed to direct the laser beam LB for flat-bed cutting.

The single lens element 80 is preferably composed either of fused silica or a high power compatible high-thermal conductivity material, such as ZnS or Sapphire, which has benefits for contamination resistance. The lens element 80 is moveable along the optical axis A to create a Z-movement of the focus point FP. Due to the horizontal orientation of the lens element 80, contamination tends to fall down due to gravity. Components 84, 86 that may generate particles, such as actuators, drives, joints, bearings, and the like, are situated below the lens element 80 or are disposed at the lower side of the lens element 80. The components 84, 86 can also be separated from the optical cleanroom in the head 50 using sealing features (not shown).

Having an understanding of the laser processing head 50 with its internal optics 55 in the housing 60, discussion now turns to further details of the present disclosure.

Figure 3:
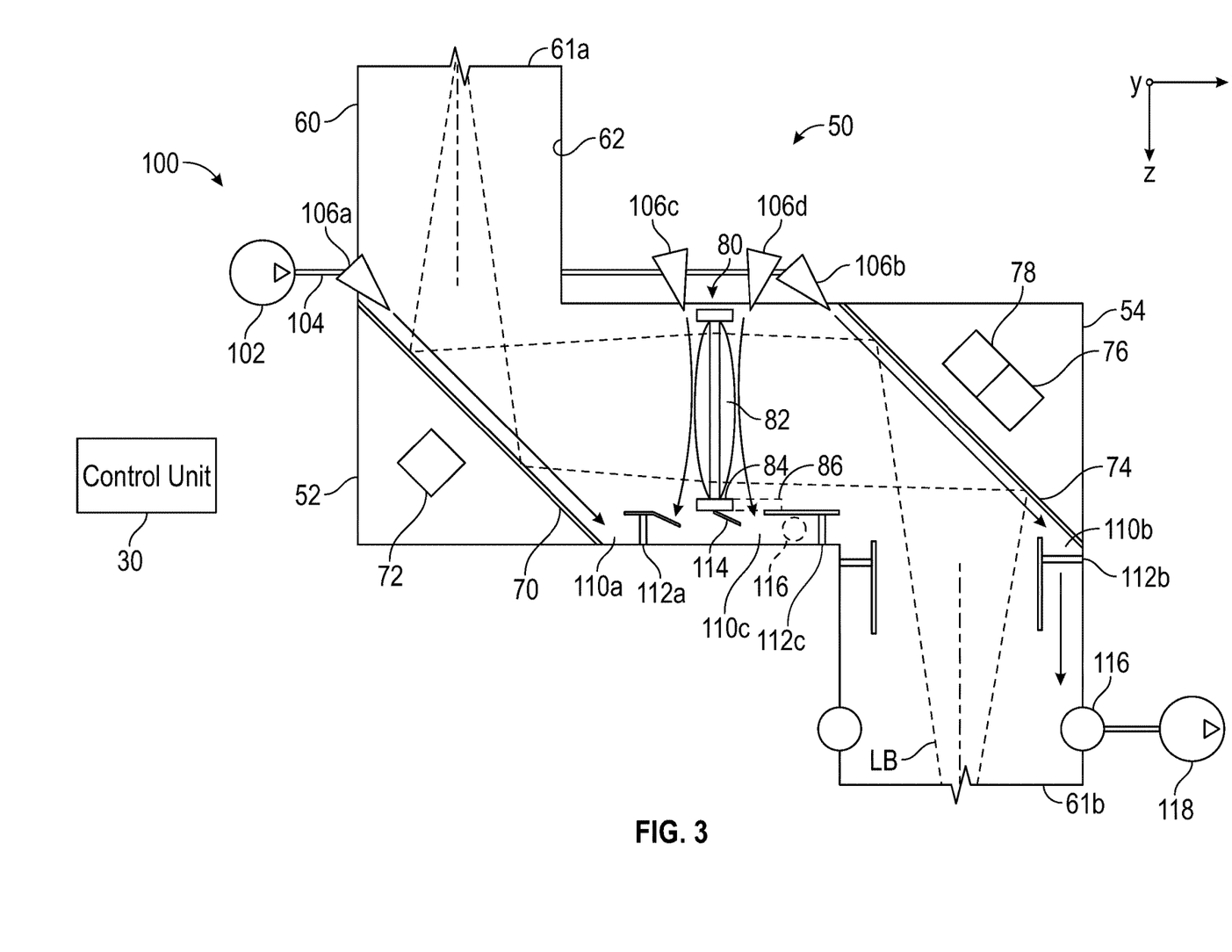
FIG. 3 illustrates a laser processing head of the present disclosure in more detail.

As shown in FIG. 3, a laser processing head 50 for directing the laser beam LB is shown in more detail. As schematically shown, the head 50 includes a housing 60, a first reflector 70, a lens element 80, and a second reflector 74. The housing 60 has an interior 62 for passage of the laser beam LB along an optical axis A from an inlet 61a to an outlet 61b of the housing 60. In general, the inlet 61a can include a laser source (22, 24: FIG. 2) and cover slide (64: FIG. 2) to separate a cleanroom for the optics 55 from any connectors or the like. Likewise, the outlet 61b includes a cover slide (66: FIG. 2) to separate the optics 55 from the process area of the laser beam LB at the workpiece.

The first reflector 70 is disposed in the interior 62 of the housing 60 and deflects the laser beam LB from the inlet 61a to the lens element 80. As shown, the optical axis A is deflected or turned by the first reflector 70 from a longitudinal (vertical) direction in the Z-axis to a lateral (horizontal) direction in the X-Y plane. The second reflector 74 in turn deflects the laser beam LB from the lateral direction to the longitudinal (vertical) direction toward the outlet 61b. The lens element 80 disposed between the reflectors 70, 74 can be moved along the lateral direction to change the magnification of the head 50, which adjusts a focal length of the laser beam LB beyond the outlet 61b, as noted above. In general and as shown, the lens element 80 can include a lens 82 (or group of lenses) disposed in a mount or mechanical structure 84 that can be moved by one or more actuators or drives 86.

A cross-jet assembly 100 is arranged on the head 50 to direct purge gas toward the internal optics 55 of the head 50 and to remove contaminants that can interfere with operation. The cross-jet assembly 100 includes a gas source 102, which can include a compressor, pump, source of gas, filter, etc. One or more nozzles 106a-d connected to one or more delivery lines 104 are configured to direct purge gas across one or more of the first reflector 70, the second reflector 74, and the lens element 80 in the interior 62 of the housing 60. In general, the gas source 102 can be disposed at distance from the housing 60, and the delivery lines 104 can run on the outside and/or inside of the housing 60. Likewise, the nozzles 106a-d can be disposed on the outside and/or inside of the housing 60, but the nozzles 106a-d have their outlets for the gas directed in the interior 62 toward the optical components 70, 74, 80.

To collect the contaminants, one or more collection areas 110a-c are disposed in the interior 62 across from the one or more nozzles 106a-d. As discussed below, these collection areas 110a-c can have filters 112a-c, ports 116, diaphragms, or check valves associated with them to prevent contaminated air from flowing back through diaphragms/filters during temperature/pressure equalization.

The purge gas removes particulates and other contaminants from the surfaces of these components 70, 74, 80 by sweeping them off the surfaces. As will be appreciated, contaminants may enter the housing 60 during assembly or repair and may become dislodged due to vibration and movement. Internal moving component inside the housing 60 may also produce contamination. Due the high power of the laser beam LB, the contamination can be detrimental to the head 50 and its operation so the assembly 100 is used to mitigate its impact.

As shown in the detailed configuration of FIG. 3, a first nozzle 106a is disposed adjacent one end of the first reflector 70 and is configured to direct the purge gas across the first reflector 70. A collection area 110a is disposed in the interior 62 adjacent an opposite end of this first reflector 70 to collect any contaminants. In other words, the collection area 110a is downstream of the first nozzle 106a to collect any containments swept from the first reflector 70. A second nozzle 106b is disposed adjacent one end of the second reflector 74 and is configured to direct the purge gas across the second reflector 74 so a second collection area 110b in the interior 62 adjacent an opposite end of the second reflector 74 can collect any contaminants. In other words, the second collection area 110b is downstream of the second nozzle 106a to collect any containments swept from the second reflector 74. A set of nozzles 106c-d are disposed adjacent one end of the lens element 80 and are configured to direct the purge gas across the opposing faces or sides of the lens 82. A collection area 110c disposed in the interior 62 adjacent an opposite end of the lens element 80 can collect any contaminants. In other words, the collection area 110c is downstream of the nozzle 106c-d to collect any containments swept from the lens element 80.

More or fewer nozzles 106a-d and collection areas 110a-c can be used depending on the implementation. Likewise, the collection areas 110a-c can be arranged as desired. For example, the collection area 110b in FIG. 3 can include multiple opposing areas about the housing's interior 62, or the collection area 110b may be a ring-shaped area disposed around the inside perimeter of the housing's interior 62.

The gas source 102 and the nozzles 106a-d can provide particular flow rates and pressures to effectively sweep contaminants away from the optics 55. The nozzles 106a-d can take any number of forms. For example, the nozzles 106a-d can include jet nozzles. The nozzles 106a-d can include de Laval nozzles, de Laval fan nozzles, or convergent-divergent nozzles to provide uniform sweeping of larger areas and to provide consistent flow of the purge gas across surfaces of the optics 55. Because certain nozzles can produce considerable noise when sending high volumes of purge gas through the head 50, the nozzles 106a-d can include noise isolation features. Additionally, the nozzles 106a-d can have needle valves or other elements to control the flow rate per nozzle 106a-d. The nozzles 106a-d control the distribution and shaping of the purge gas flowing past the optics. The outlet ports 116 could also have valves and flow control elements. Moreover, baffle plates, cross-sectional ratios, and other features can be designed into the interior 62 of the housing 60 to control the distribution and shaping of the purge gas.

The collection areas 110a-c can include particle filters 112a-c configured to pass the purge gas through, but configured to trap contaminants at or near the collection areas 110a-c. The filters 112a-c can include a metal mesh filter, and the filters 112a-c can be replaceable. Moreover, at least one port 116 in the housing 110 can communicate with the interior 62. As shown, each of the collection areas 110a-c may have at least one port 116 associated with the area. The at least one port 116 may be an open port allowing both gas and contaminants to pass out of the housing's interior 62. Additionally, the port 116 can have a membrane configured to pass the purge gas out of the interior 62 after the gas has swept the optical elements 70, 74, 80. The membrane of the at least one outlet port 116 allows gas to leave the optics 55, but stops dirty air from entering.

To help pass the purge gas through the filters 112a-c and to trap the contamination, the ports 116 in communication with the interior 62 can having a negative pressure applied to them. For example, an active suction system (e.g., pump) or drain 118 can pull the purging gas out of the housing 62. As also shown, one or more traps 114 (e.g., vanes, walls, barriers, passages, screens, etc.) can be disposed across the collection areas 110a-c in the interior 62 to trap the contaminants swept into the area 110c by the purge gas.

As shown in FIG. 3, the head 50 may be generally used and manipulated to be in an "upright" position, meaning that the source of the laser beam LB at the inlet 61a is orientated vertically somewhere above the workpiece beyond the outlet 61b. The laser beam LB is therefore directed in a downward in a vertical direction (along the Z-axis). Although this may not always be true, this upright orientation for the head 50 is preferred because gravity can naturally help keep back spatter, cast off, and the like of the laser process from affecting the head 50, fouling the optics 55, etc.

For this reason, the nozzles 106a-d are preferably arranged toward the "top" or "upper" end of the housing 60 so they inject the gas vertically downward across the optical components 70, 74, 80 to the collection areas 110a-c, which are arranged toward the "bottom" or "lower" end of the housing 60. This allows gravity to assist the purging process to clear contaminants from the optical components 70, 74, 80. In one implementation, the reflectors 70, 74 and associated mechanics are integral parts of the input/output modules (63a and 63c; FIG. 2), and the module (63b; FIG. 2) containing the lens element 80 and lens actuator system (84, 86) can be rotated around the optical axis A to adapt its orientation to other head orientations.

As noted, the lens element 80 is movable in the interior 62. Preferably, a mechanical structure or mount 84 and actuator or drive 86 for moving the lens element 80 are disposed toward the "bottom" or "lower" end of the lens element 80 and the collection area 110c. This mechanical structure 84 can include bearings, joints, and the like connected to the drive 86, which can include an electric motor, a solenoid, or other suitable device. Any debris produced by the mechanical structure 84, such as burs, shavings, particles, etc., would tend to fall by gravity and be swept by purge gas directly to the collection area 110c without passing over the lens 82.

According to one configuration, the first reflector 70 can be a reflector that is cooled by a cooling arrangement 72, which is only schematically shown in the extension 52. Apart from the cover slides (64, 66) that are less-expensive consumables, this first reflector 70 is the only internal component of the housing 60 onto which contaminants may tend to fall due to gravity. Accordingly, making this reflector 70 of a material with high thermal conductivity, e.g. copper, that has advantages for contamination resistance.

The second reflector 74 faces vertically downward toward the Z-direction and would not tend to have contaminants fall on it. Therefore, the second reflector 74 can be a partially transmissive reflector so laser and/or process light can pass through the second reflector 74 to a monitoring arrangement 76, which is only schematically shown in the extension 54. As will be appreciated, the monitoring arrangement 76 can use conventional sensors and optics for laser and/or process observations. Additionally or alternatively, this second reflector 74 can be movable to change the lateral placement of the focal point FP on the workpiece WP so that the extension 54 can include a mechanism 78 for tilting and orienting the second reflector 74.

As schematically shown in FIG. 3 and as noted previously, a control unit 30 can be used to control operation of components of the system. For example, the control unit 30 can operate valves, pumps 102, and the like to control delivery of purge gas in the cross-jet assembly 100 to the nozzles 106a-d. The control unit 30 can operate valves, pumps, and the like to control evacuating of purge gas from the housing's interior 62 with the active suction system or drain 118. To monitor operation, the control unit 30 can have sensors (not shown) to measure the flow rate, pressure, temperature, etc. of the purge gas. If the control unit 30 is integrated with other functionalities for the laser processing head 50, the control unit 30 can move the lens element 80 an/or reflectors 70, 74 in a cleaning cycle.

Figure 4:
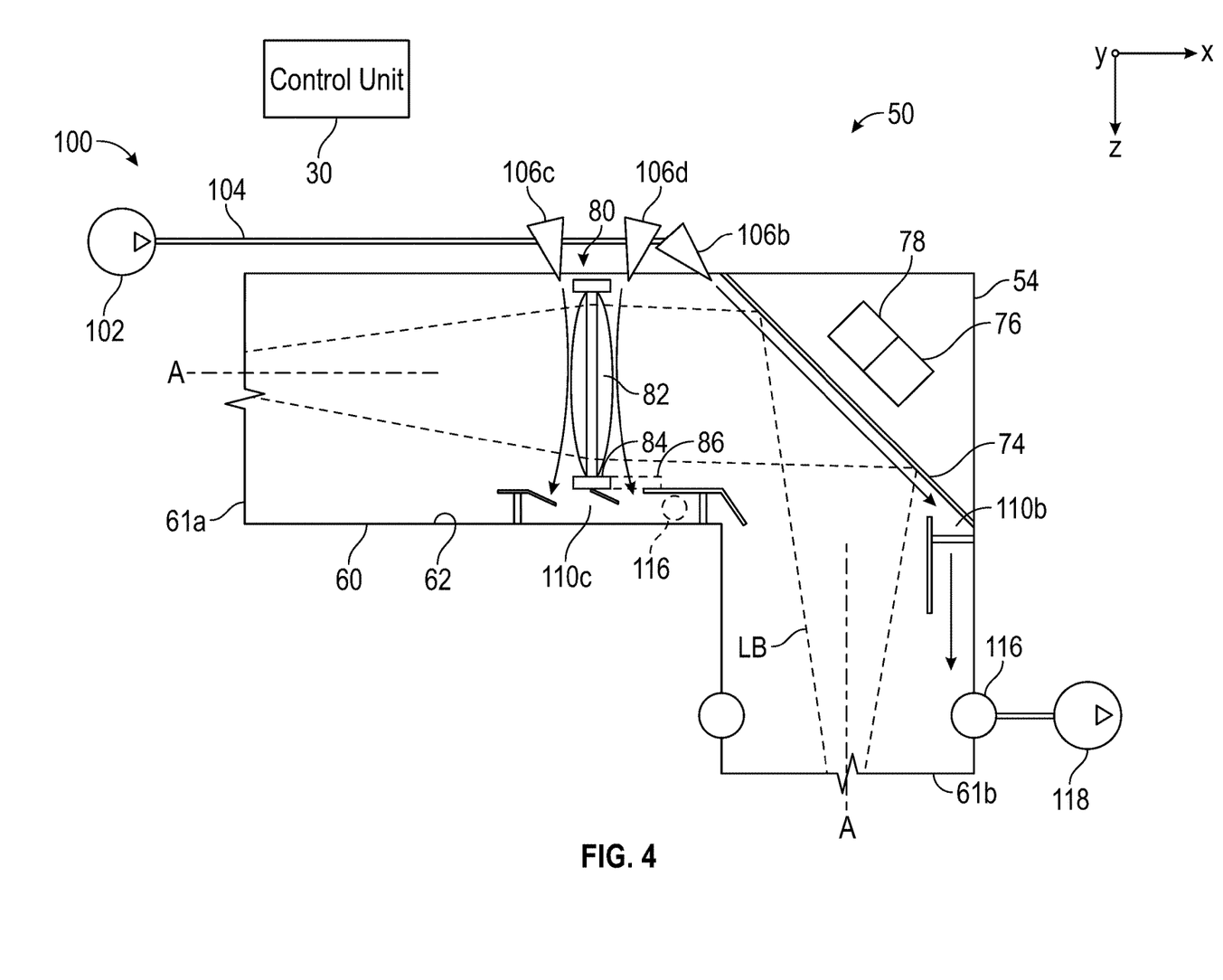
FIG. 4 illustrates another laser processing head of the present disclosure in more detail.

Another configuration of a laser processing head 50 of the present disclosure is illustrated in FIG. 4. Here, the head 50 includes similar components to those described above so that similar reference numbers are used. In contrast to the previous configuration, the input 61a of this head 20 where the laser input (cable receiver and delivery fiber) are oriented horizontally. Accordingly, the laser beam radiation passes horizontally through the lens element 80 and is turned vertically by a reflector 74. This configuration eliminates the need for the additional reflector (70; FIG. 3) that may tend to be contaminated. This configuration also allows purge gas elements to be added to the cover slide (64, 66; FIG. 2). These added purge gas elements (not shown) can be similar in design to the components used for the lens element 80.

In summary, internal contamination may not always be preventable. The disclosed laser processing head 50 in FIGS. 1 through 4 seeks to reduce the possible impact/interaction of internal contamination with laser radiation. The arrangement of cross-jet nozzles 106a-d in the head 50 actively purges or floods the surfaces of the optical components 70, 74, 80 in the internal optics 55. The internal cross-jet nozzles 106a-d are preferably directed to all optical surfaces on which the laser beam LB impinges. In fact, purge gas can be used on the cover slides (64, 66; FIG. 2) to remove contaminants.

The nozzles 106a-d are fed through the purge gas channel 104, and the emitted stream is guided into the interior 62 of the head's housing 60. Preferably, one or more collections areas 110a-c, metallic mesh filters 112a-c, traps 114, and/or ports 116 are used with the purge gas through the purge system 100 so potential contaminants remain collected, trapped, and/or removed from the interior 62. Instead of metallic mesh filters, other types of filters or cleanroom compatible adhesive tapes may be used. Because the processing head 50 has few optical surfaces and because they are arranged in a vertical orientation, the cross-jet nozzle 106a-d and purge gas can be more effective.

During operation of the laser processing head 50, purging with the purge gas, such as clean nitrogen gas, may be performed continuously or intermittently. At the same time, under-pressure may be applied in the collection areas 110a-c of the housing 60 using the active suction system or drain 118. Incoming purge gas from the inlet nozzles 106a-d is directed towards the optical elements 70, 74, 80 from above. Due to the orientation of the lens element 80, contaminants are not expected to be "captured" on the lens 82 and its mount 84 while the contaminants are being purged. The under-pressure applied underneath the lens element 80 creates a well-defined particle sink in the collection areas 110a-c.

In addition to removing contamination in the form of particles, dust, debris, etc., the cross-jet assembly 100 can also help in purging vapors and evaporating substances from the housing's interior 62. Vapors can be generated during combustion and can cool relatively fast. The cross-jet assembly 100 having the active suction system drain 118 can remove the vapors directly so the vapor does not settle on the lens element 80 or other surfaces. In addition to vapors, evaporating substances (e.g., coolant residues, oils, and greases) can also be removed from the interior 62 using the active suction system or drain 118.

When used during operation of the laser beam LB, the purge gas is preferably an inert gas, such as nitrogen, to limit any oxidation reaction between particle(s) and the laser beam LB so that burning can be avoided on the lens 82 and reflectors 70, 74. The purge gas can be used when the laser is turned "OFF." In that instance, the use of an inert gas is not a necessity as any other gas could be used.

To enhance the effects, the head 50 may be oriented or operated in an intensive cleaning position, and/or a movement pattern can be performed for the lens element 80, reflector 74, etc. For example, it is possible to vibrate the optical component 70, 74, 80 to shake off contaminants on the surfaces. This shaking can be combined with a specific movement of the optical element 70, 74, 80 in front of the cross-jet nozzle 106a-d. For example, the drive 86 can move the lens 82 relative to the nozzles 106c-d so that the purge gas can better sweep the surfaces of the lens 82. In such a configuration, the nozzles 106c-d for the lens element 80 can be stationary in the housing 60. This may be practical given the small movement expected for the lens element 80. Alternatively, the nozzles 106c-d can be movable together with the lens element 80 using appropriate mounts, conduits, flexible joints, etc. Either way, a wiping effect of the purging gas on the optical element 70, 74, 80 can be obtained. The reflector 74 if movable can also be manipulated with respect to the nozzle 106b. The control unit 30 may control the components for these cleaning operations.

As may be typical, the processing head 50 can include components at its outlet 61b for capacitive height sensing so that a distance of the head's laser nozzle can be determined from a workpiece. Purging gas is used in such situations to avoid contamination of the height sensor. Accordingly, the purging gas used by the cross jet assembly 100 can be further directed towards the capacitive height sensing components of the laser processing head 50 so the gas can still serve as purging gas at the laser process.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A laser processing head for directing a laser beam, the head comprising:
   a housing having an interior for passage of the laser beam along an optical axis from an inlet to an outlet;
   at least one reflector disposed in the interior of the housing and reflecting the laser beam along the optical axis between the inlet and the outlet;
   a lens element disposed in the interior of the housing, the lens element being movable along the optical axis and being configured to adjust a focal length of the laser beam;
   one or more nozzles configured to direct purge gas across one or more of the at least one reflector and the lens element; and
   one or more collection areas disposed in the interior of the housing and configured to collect contamination directed from the purge gas,
   wherein at least one collection area of the one or more collection areas is disposed adjacent the lens element and downstream from the one or more nozzles, and the at least one collection area is disposed upstream and spaced from the outlet of the housing.

2. The head of claim 1, wherein the at least one reflector comprises a first reflector; wherein the one or more nozzles comprise a first of the one or more nozzles disposed adjacent the at least one reflector and configured to direct the purge gas across the at least one reflector; and wherein the one or more collection areas comprises a first of the one or more collection areas disposed in the interior adjacent the at least one reflector and downstream of the first nozzle.

3. The head of claim 2, wherein the at least one reflector comprises a second reflector; wherein the one or more nozzles comprise a second of the one or more nozzles disposed adjacent the second reflector and configured to direct the purge gas across the second reflector; and wherein the one or more collection areas comprises a second of the one or more collection areas disposed in the interior adjacent the second reflector and downstream of the second nozzle.

4. The head of claim 1, wherein the at least one reflector comprises a first reflector and a second reflector, the first reflector comprises a reflector having a thermal conductivity and is cooled; and wherein the second reflector comprises a partially transmissive reflector.

5. The head of claim 1, wherein the one or more nozzles comprise a first of the one or more nozzles disposed adjacent one end of the lens element and configured to direct the purge gas across a first side of the lens element.

6. The head of claim 5, wherein
   the one or more nozzles comprise a second of the one or more nozzles disposed adjacent the one end of the lens element and configured to direct the purge gas across a second side of the lens element.

7. The head of claim 1, comprising a source disposed in communication with the one or more nozzles and configured to direct the purge gas to the one or more nozzles.

8. The head of claim 1, wherein each of the one or more collection areas comprises a filter configured to pass the purge gas and configured to trap the contamination.

9. The head of claim 1, wherein the housing comprises at least one port disposed in communication with the interior, the at least one port configured to pass the purge gas out of the interior.

10. The head of claim 9, wherein the at least one port comprises a membrane configured to pass the purge gas from the interior and to prevent reverse flow into the interior.

11. The head of claim 9, further comprising a pump disposed in communication with the at least one port and configured to draw the purge gas from the housing.

12. The head of claim 1, wherein each of the one or more collection areas comprises a filter configured to pass the purge gas and configured to trap the contamination; and wherein the housing comprises at least one port disposed in communication with the purge gas from the filter and having a negative pressure applied thereto.

13. The head of claim 1, wherein the one or more collection areas comprise one or more traps disposed across the interior and being configured to trap the contamination.

14. The head of claim 1, wherein the inlet comprises a cover slide; and wherein the outlet comprises a cover slide.

15. The head of claim 1, wherein the at least one reflector comprises a first reflector and a second reflector, and the first and second reflectors are tilted in substantially the same direction with respect to the optical axis.

16. A laser processing head for directing a laser beam, the head comprising:
   a housing having an interior for passage of the laser beam along an optical axis from an inlet to an outlet;
   a first reflector disposed in the interior of the housing and reflecting the laser beam along the optical axis from the inlet;
   a second reflector disposed in the housing and reflecting the laser beam from the first reflector along the optical axis toward the outlet;
   a lens element disposed in the interior of the housing between the first and second reflectors, the lens element being movable along the optical axis and being configured to adjust a focal length of the laser beam;
   one or more nozzles configured to direct purge gas across one or more of the first reflector, the second reflector, and the lens element; and
   one or more collection areas disposed in the interior and configured to collect contamination directed from the purge gas,
   wherein the first and second reflectors are tilted substantially in the same direction with respect to the optical axis,
   wherein at least one collection area of the one or more collection areas is disposed adjacent the lens element and downstream from the one or more nozzles, and the at least one collection area is disposed upstream and spaced from the outlet of the housing.

17. The head of claim 16, further comprising:
   at least one of: (i) a source disposed in communication with the one or more nozzles and configured to direct the purge gas to the one or more nozzles, and (ii) a drain disposed in communication with housing and configured to draw the purge gas from the housing; and
   a control unit configured to operate the at least one of the source and the drain.

18. The head of claim 17, wherein at least one of the first and second reflectors is movable in the housing; and wherein the control unit is configured to move at least one of: (a) the lens element and (b) the at least one of the first and second reflectors in relation to the operation of the at least one of the source and the drain.

19. The head of claim 16, wherein each of the one or more collection areas comprises a trap configured to trap the contamination.

20. A laser cutting machine used with a laser source to cut a workpiece, the machine comprising:
a laser processing head receiving laser radiation from the laser source, the head at least including:
a housing having an interior for passage of the laser radiation along an optical axis from an inlet to an outlet;
at least one reflector disposed in the interior of the housing and reflecting the laser radiation along the optical axis between the inlet and the outlet;
a lens element disposed in the interior of the housing, the lens element being movable along the optical axis and being configured to adjust a focal length of the laser radiation beyond the outlet;
one or more nozzles configured to direct purge gas across one or more of the at least one reflector and the lens element; and
one or more collection areas disposed in the interior and configured to collect contamination directed from the purge gas,
wherein at least one collection area of the one or more collection areas is disposed adjacent the lens element and downstream from the one or more nozzles, and the at least one collection area is disposed upstream and spaced from the outlet of the housing; and
an actuator supporting the laser processing head and being configured to manipulate the laser processing head relative to the workpiece.

21. The machine of claim 20, further comprising:
at least one of: (i) a source disposed in communication with the one or more nozzles and configured to direct the purge gas to the one or more nozzles, and (ii) a drain disposed in communication with the housing and configured to draw the purge gas from the housing; and
a control unit configured to operate the at least one of the source and the drain.

22. The machine of claim 21, wherein the at least one reflector is movable in the housing; and wherein the control unit is configured to move at least one of: (a) the lens element and (b) the at least one reflector in relation to the operation of the at least one of the source and the drain.

23. The machine of claim 20, wherein the at least one reflector comprises a first reflector and a second reflector, and the first and second reflectors are tilted in substantially the same direction with respect to the optical axis.

24. The head of claim 20, wherein each of the one or more collection areas comprises a trap configured to trap the contamination.

* * * * *